United States Patent
Park et al.

(10) Patent No.: US 8,570,362 B2
(45) Date of Patent: Oct. 29, 2013

(54) METHOD AND APPARATUS FOR DISPLAYING TWO-DIMENSIONAL OR THREE-DIMENSIONAL IMAGE SEQUENCE WHILE ADJUSTING FRAME RATE

(75) Inventors: Sang-moo Park, Uijeongbu-si (KR); Yong-tae Kim, Seoul (KR); Seon-deok Hwang, Seoul (KR); Dae-sik Kim, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 630 days.

(21) Appl. No.: 12/541,372

(22) Filed: Aug. 14, 2009

(65) Prior Publication Data

US 2010/0157024 A1 Jun. 24, 2010

(30) Foreign Application Priority Data

Dec. 24, 2008 (KR) ........................ 10-2008-0133839

(51) Int. Cl.
*H04N 15/00* (2006.01)
*H04N 13/04* (2006.01)

(52) U.S. Cl.
USPC ................................ 348/51; 345/87; 345/428

(58) Field of Classification Search
USPC .............................. 345/87, 428, 690; 348/441
See application file for complete search history.

(56) References Cited

U.S. PATENT DOCUMENTS

| | | | |
|---|---|---|---|
| 8,228,427 B2 * | 7/2012 | Mori et al. ............... | 348/441 |
| 2004/0207649 A1 * | 10/2004 | Shih ...................... | 345/690 |
| 2004/0252756 A1 | 12/2004 | Smith et al. | |
| 2008/0252578 A1 | 10/2008 | Kim et al. | |
| 2008/0284801 A1 | 11/2008 | Brigham et al. | |
| 2010/0231593 A1 * | 9/2010 | Zhou et al. ............... | 345/428 |

FOREIGN PATENT DOCUMENTS

| | | |
|---|---|---|
| EP | 1 511 328 A2 | 3/2005 |
| EP | 2 066 123 A1 | 6/2009 |
| JP | 9-51552 A | 2/1997 |
| WO | 99/51029 A2 | 10/1999 |

(Continued)

OTHER PUBLICATIONS

Communication / Search Report issued by the European Patent Office on Mar. 1, 2010 in EP Appln. No. 09169203.8.
Communication dated Sep. 6, 2012 issued by the European Patent Office in counterpart European Patent Application No. 09 169 203.8.
Communication dated Mar. 20, 2013 issued by the European Patent Office in counterpart European Patent Application No. 12153337.4.

(Continued)

*Primary Examiner* — Dustin Nguyen
(74) *Attorney, Agent, or Firm* — Sughrue Mion, PLLC

(57) ABSTRACT

Provided are a method and apparatus for displaying a two-dimensional (2D)/three-dimensional (3D) image, and apparatus to execute the same, the method including determining whether an input image sequence having a first frame rate is a 2D image sequence or a 3D image sequence, wherein, if the input image sequence is a 2D image sequence, generating a 2D output image sequence having a second frame rate, the 2D output image sequence including the input image sequence and a 2D intermediate image generated from the input image sequence, and wherein, if the input image sequence is a 3D image sequence, generating a 3D output image sequence having a third frame rate, where a left-viewpoint intermediate image, a right-viewpoint intermediate image and the input image sequence are repeatedly included in the 3D output image sequence, the left-viewpoint intermediate image is determined from at least one left-viewpoint image in a left-viewpoint image sequence included in the input image sequence, and the right-viewpoint intermediate image is determined from at least one right-viewpoint image in a right-viewpoint image sequence included in the input image sequence.

28 Claims, 12 Drawing Sheets

(56) References Cited

FOREIGN PATENT DOCUMENTS

| WO | 03/088682 A1 | 10/2003 |
| WO | 2007/085950 A2 | 8/2007 |
| WO | 2008/035474 A1 | 3/2008 |

OTHER PUBLICATIONS

Communication dated Mar. 22, 2013 issued by the European Patent Office in counterpart European Patent Application No. 09 169 203.8.

* cited by examiner

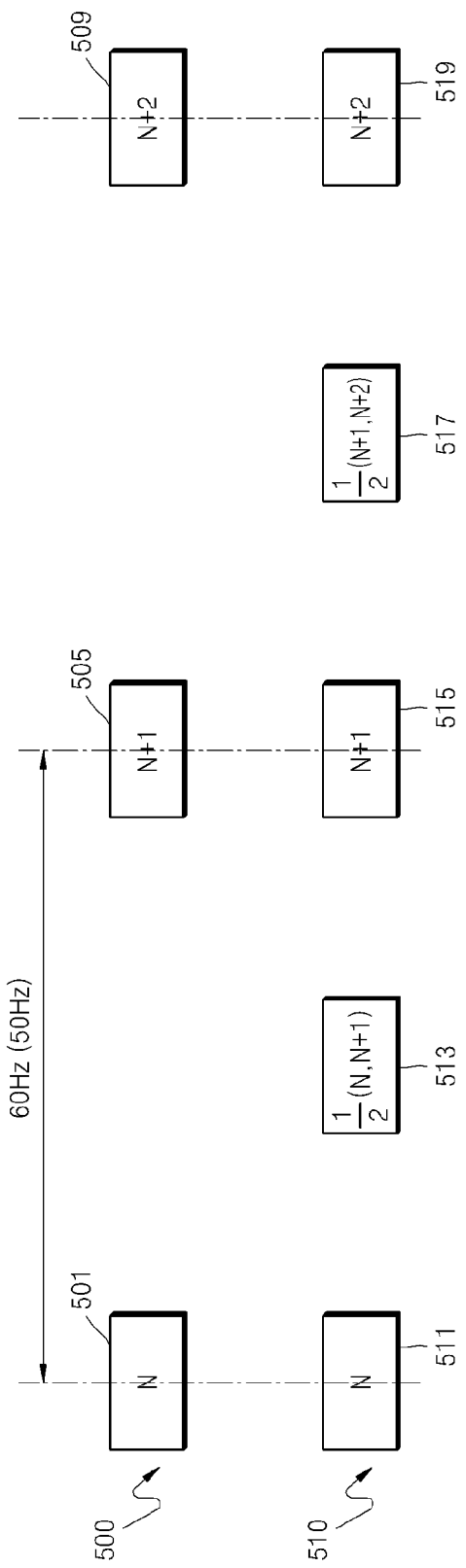

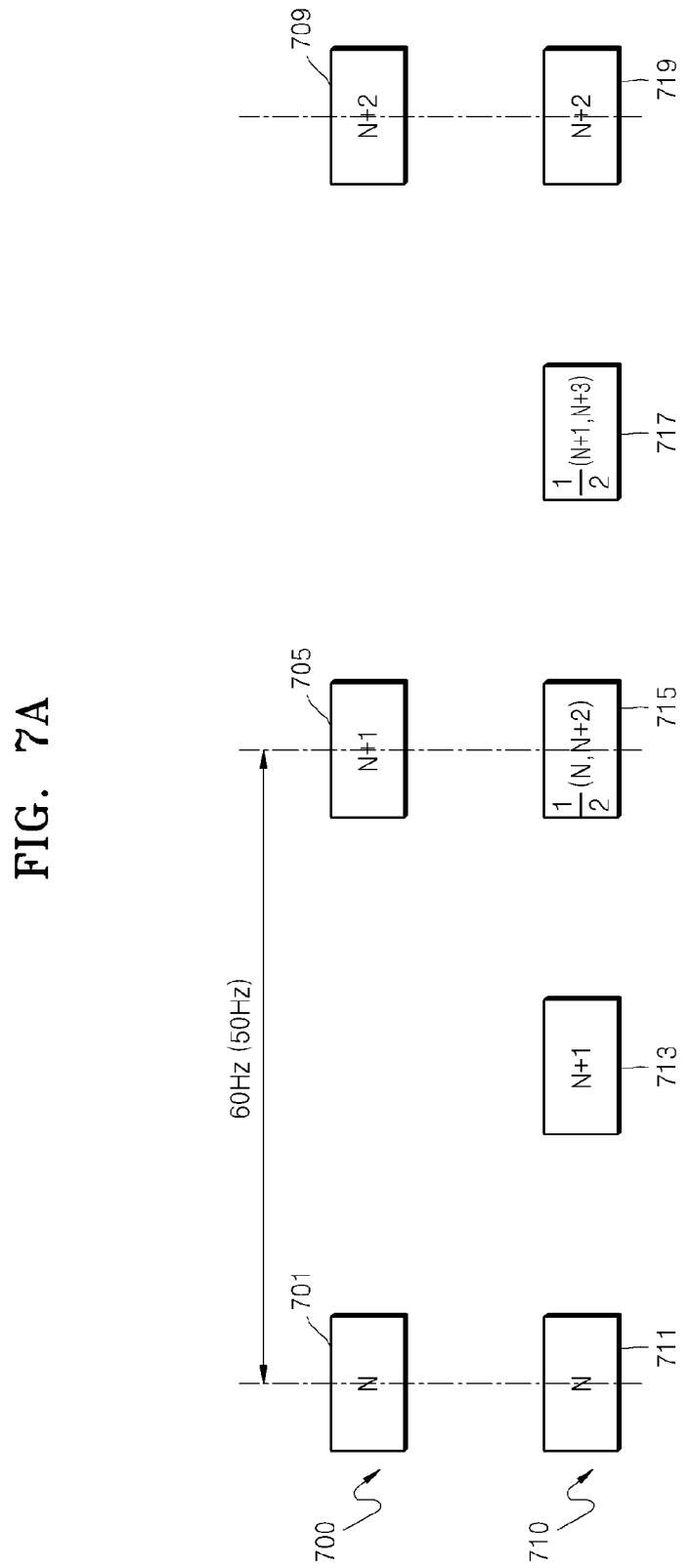

METHOD AND APPARATUS FOR DISPLAYING TWO-DIMENSIONAL OR THREE-DIMENSIONAL IMAGE SEQUENCE WHILE ADJUSTING FRAME RATE

CROSS-REFERENCE TO RELATED PATENT APPLICATION

This application claims priority from Korean Patent Application No. 10-2008-0133839, filed on Dec. 24, 2008, in the Korean Intellectual Property Office, the disclosure of which is incorporated herein in its entirety by reference.

BACKGROUND OF THE INVENTION

1. Field of the Invention

Apparatuses consistent with the present invention relate to displaying a two-dimensional (2D) or three-dimensional (3D) image.

2. Description of the Related Art

As hardware and software related to display panels become more developed, there is a growing need for an image sequence having a higher frame rate. In order to adjust a frame rate of a two-dimensional (2D) image sequence, new images that are to be displayed between consecutive images included in an input image sequence are generated, and a display panel is driven to display an output image sequence including the generated images at an increased frame rate.

In order to display a three-dimensional (3D) image sequence, a left-viewpoint image and a right-viewpoint image are input together and are alternately displayed on a display panel. Thus, the frame rate of the 3D image sequence should be adjusted and the display panel should be driven differently compared to when a 2D image sequence is processed in the order in which a plurality of images therein were input.

SUMMARY OF THE INVENTION

Illustrative, non-limiting embodiments of the present invention overcome the above disadvantages, and other disadvantages not described above. Also, the present invention is not required to overcome the disadvantages described above, and an illustrative, non-limiting embodiment of the present invention may not overcome any of the problems described above.

Exemplary embodiments of the present invention provide a method and apparatus for displaying a two-dimensional (2D) or three-dimensional (3D) image.

According to an aspect of the present invention, there is provided a method of displaying a two-dimensional 2D or a three-dimensional (3D) image, the method including determining whether an input image sequence having a first frame rate is a 2D image sequence or a 3D image sequence, generating a 2D output image sequence having a second frame rate if it is determined that the input image sequence is the 2D image sequence, wherein the 2D output image sequence comprising the first input image sequence and a 2D intermediate image generated from the first input image sequence, and generating a 3D output image sequence at a third frame rate if it is determined that the input image sequence is the 3D image sequence, wherein a left-viewpoint intermediate image, a right-viewpoint intermediate image and the input image sequence are repeatedly included in the 3D output image sequence, the left-viewpoint intermediate image is determined from at least one left-viewpoint image in a left-viewpoint image sequence included in the input image sequence, and the right-viewpoint intermediate image is determined from at least one right-viewpoint image in a right-viewpoint image sequence included in the input image sequence.

If it is determined that the input image sequence is the 2D image sequence, each of the 2D intermediate images may be displayed between adjacent images included in the input image sequence having the first frame rate. If it is determined that the input image sequence is the 3D image sequence, the left-viewpoint intermediate image may be displayed between adjacent left-viewpoint images included in the left-viewpoint image sequence, and the right-viewpoint intermediate image may be displayed between adjacent right-viewpoint images corresponding to the adjacent left-viewpoint images.

If it is determined that the input image sequence is the 2D image sequence, the generating the 2D output image sequence may include generating the 2D intermediate image by performing motion estimation or motion compensation on the adjacent images included in the input image sequence having the first frame rate.

If it is determined that the input image sequence is a 3D image sequence, the generating the 3D output image sequence may include determining the left-viewpoint intermediate image to be a first left-viewpoint image from among the adjacent left-viewpoint images and determining the right-viewpoint intermediate image to be a first right-viewpoint image from among the adjacent right-viewpoint images.

If it is determined that the input image sequence is the 3D image sequence, the generating the 3D output image sequence may include determining the left-viewpoint intermediate image to be a combination of a first left-viewpoint image and a last left-viewpoint image from among the adjacent left-viewpoint images and determining the right-viewpoint intermediate image to be a combination of a first right-viewpoint image and a last right-viewpoint image from among the adjacent right-viewpoint images.

If it is determined that the input image sequence is the 3D image sequence and the third frame rate is twice the first frame rate, the generating the 3D output image sequence may include generating the 3D output image sequence to sequentially include a first left-viewpoint image from among the adjacent left-viewpoint images, a first right-viewpoint image from among the adjacent right-viewpoint images, the left-viewpoint intermediate image, the right-viewpoint intermediate image, a last left-viewpoint image from among the adjacent left-viewpoint images, and a last right-viewpoint image from among the adjacent right-viewpoint images.

If it is determined that the input image sequence is the 3D image sequence and the third frame rate is four times the first frame rate, the generating the 3D output image sequence may include generating the 3D output image sequence to sequentially include a first left-viewpoint image from among the adjacent left-viewpoint images, a first right-viewpoint image from among the adjacent right-viewpoint images, the left-viewpoint intermediate image, the right-viewpoint intermediate image, a last left-viewpoint image from among the adjacent left-viewpoint images, and a last right-viewpoint image from among the adjacent right-viewpoint images, and a black image is included between two adjacent images.

If it is determined that the input image sequence is the 3D image sequence and the third frame rate is four times the first frame rate, the generating the 3D output image sequence may include generating the 3D output image sequence to sequentially include a first left-viewpoint image from among the adjacent left-viewpoint images, a first right-viewpoint image from among the adjacent right-viewpoint images, the left-viewpoint intermediate image, the right-viewpoint intermediate image, a last left-viewpoint image from among the adjacent left-viewpoint images, and a last right-viewpoint image from among the adjacent right-viewpoint images, and each of the images may be continuously included twice in the 3D output image sequence.

The determining whether the input image sequence having the first frame rate is the 2D image sequence or the 3D image sequence may include analyzing the input image sequence or receiving a user's instruction indicating whether the input image sequence is to be displayed as the 2D image sequence or the 3D image sequence and determining whether the input image sequence is the 2D image sequence or the 3D image sequence, based on the user's instruction.

The method may include displaying the 2D output image sequence or the 3D output image sequence in synchronization with the second frame rate or the third frame rate, respectively.

The first frame rate may be 60 Hz, the second frame rate may be 120 Hz or 240 Hz, and the third frame rate may be 120 Hz or 240 Hz.

According to another aspect of the present invention, there is provided a display device for displaying a two-dimensional (2D) or a three-dimensional (3D) image, the display device including an image display determination unit which determines whether an input image sequence having a first frame rate is a 2D image sequence or a 3D image sequence, a 2D frame rate conversion unit which receives the input image sequence and generates a 2D output image sequence having a second frame rate if the image display determination unit determines that the input image sequence is the 2D image sequence, wherein the 2D output image sequence comprises the input image sequence and a 2D intermediate image generated from the input image sequence, and a 3D frame rate conversion unit which receives the input image sequence, and generates a 3D output image sequence having a third frame rate if the image display determination unit determines that the input image sequence is the 3D image sequence, wherein a left-viewpoint intermediate image, a right-viewpoint intermediate image and the input image sequence are repeatedly included in the 3D output image sequence, the left-viewpoint intermediate image is determined from at least one left-viewpoint image in a left-viewpoint image sequence included in the input image sequence, and the right-viewpoint intermediate image is determined from at least one right-viewpoint image in a right-viewpoint image sequence included in the input image sequence.

According to another aspect of the present invention, there is provided a system for displaying a two-dimensional (2D) or three-dimensional (3D) image, the system including an image supply source which supplies an input image sequence at a first frame rate, an image display determination unit which determines whether the input image sequence having the first frame rate is a 2D image sequence or is a 3D image sequence, a 2D frame rate conversion unit which receives the input image sequence and generates a 2D output image sequence having a second frame rate if the image display determination unit determines that the input image sequence is the 2D image sequence, wherein the 2D output image sequence comprises the input image sequence and a 2D intermediate image generated from the input image sequence, a 3D frame rate conversion unit which receives the input image sequence and generates a 3D output image sequence having a third frame rate if the image display determination unit determines that the input image sequence is the 3D image sequence, wherein a left-viewpoint intermediate image, a right-viewpoint intermediate image and the input image sequence are repeatedly included in the 3D output image sequence, the left-viewpoint intermediate image is determined from at least one left-viewpoint image in a left-viewpoint image sequence included in the input image sequence, and the right-viewpoint intermediate image is determined from at least one right-viewpoint image in a right-viewpoint image sequence included in the input image sequence, a display panel which displays the 2D output image sequence or the 3D output image sequence, and a panel driving controller which drives the display panel to display the 2D output image sequence or the 3D output image sequence in synchronization with the second frame rate or the third frame rate, respectively.

According to another aspect of the present invention, there is provided a computer readable recording medium having recorded thereon a computer program for executing the method of the exemplary embodiment.

BRIEF DESCRIPTION OF THE DRAWINGS

The above and other features and advantages of the present invention will become more apparent by describing in detail exemplary embodiments thereof with reference to the attached drawings in which:

FIG. 5A illustrates a method of doubling the frame rate of a 2D image sequence according to an exemplary embodiment of the present invention;

FIG. 7A illustrates a method of doubling the frame rate of a 3D image sequence according to another exemplary embodiment of the present invention;

DETAILED DESCRIPTION OF EXEMPLARY EMBODIMENTS OF THE INVENTION

Figure 1:
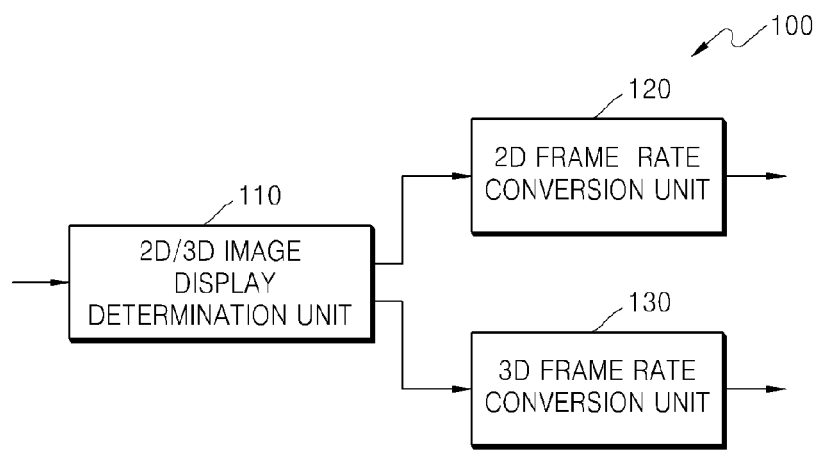
FIG. 1 is a block diagram of a display device for displaying a two-dimensional (2D)/three-dimensional (3D) image according to an exemplary embodiment of the present invention.

FIG. 1 is a block diagram of a display device 100 for displaying a two-dimensional (2D) or three-dimensional (3D) image according to an exemplary embodiment of the present invention. The display device 100 includes a 2D/3D image display determination unit 110, a 2D frame rate conversion unit 120 and a 3D frame rate conversion unit 130.

The 2D/3D image display determination unit 110 receives an input image sequence at a first frame rate, and determines whether the input image sequence is a first input image sequence which is a 2D image sequence or a second input image sequence which is a 3D image sequence. When it is determined that the input image sequence is the first input image sequence, the first input image sequence is output to the 2D frame rate conversion unit 120. When it is determined that the input image sequence is the second input image sequence, the second input image sequence is output to the 3D frame rate conversion unit 130.

The 2D/3D image display determination unit 110 may determine whether the input image sequence is a 2D image sequence or a 3D image sequence by analyzing the input image sequence. Alternatively, the 2D/3D image display determination unit 110 may receive a user's instruction that the image sequence be processed as the 2D image sequence or the 3D image sequence, and may determine that the input image sequence is the 2D image sequence or the 3D image sequence according to the user's instruction.

The 2D frame rate conversion unit 120 receives the first input image sequence (2D image sequence) from the 2D/3D image display determination unit 110. The 2D frame rate conversion unit 120 generates a plurality of 2D intermediate images from the first input image sequence, and generates a 2D output image sequence having a second frame rate, which includes the intermediate images and the first input image sequence. Hereinafter, in the present specification, an increase in a frame rate indicates how much a second frame rate of an output image sequence increases compared to the first frame rate of an input image sequence.

The 2D intermediate images are displayed between adjacent images included in the first input image sequence having the first frame rate. The 2D frame rate conversion unit 120 may generate the 2D intermediate images by performing motion estimation or motion compensation on adjacent images in the first input image sequence.

The 3D frame rate conversion unit 130 receives the second input image sequence (3D image sequence) from the 2D/3D image display determination unit 110. The 3D frame rate conversion unit 130 determines a plurality of left-viewpoint intermediate images by using at least one left-viewpoint image from a left-viewpoint image sequence included in the second input image sequence, and determines a plurality of right-viewpoint intermediate images by using at least one right-viewpoint image from a right-viewpoint image sequence included in the second input image sequence.

The 3D frame rate conversion unit 130 generates a 3D output image sequence having a third frame rate, in which the determined left-viewpoint intermediate images and right-viewpoint intermediate images and the second input image sequence are repeatedly included. The number of times that the determined left-viewpoint intermediate images and right-viewpoint intermediate images and the second input image sequence are repeatedly included, may be determined in consideration of the desired increase in the frame rate.

Each of the left-viewpoint intermediate images is displayed between adjacent left-viewpoint images included in the left-viewpoint image sequence, and each of the right-viewpoint intermediate images is displayed between adjacent right-viewpoint images included in the right-viewpoint image sequence. If the third frame rate is double the first frame rate, the 3D frame rate conversion unit 130 may determine the left-viewpoint intermediate image to be a first left-viewpoint intermediate image from among adjacent left-viewpoint images included in the left-viewpoint image sequence, and may determine the right-viewpoint intermediate image to be a first right-viewpoint intermediate image from adjacent right-viewpoint images included in the right-viewpoint image sequence.

If the third frame rate is double the first frame rate, the 3D frame rate conversion unit 130 may generate a 3D output image sequence to sequentially include a first left-viewpoint image, a first right-viewpoint image, a left-viewpoint intermediate image, a right-viewpoint intermediate image, a last left-viewpoint image, and a last right-viewpoint image.

If the third frame rate is four times the first frame rate, the 3D frame rate conversion unit 130 may generate a 3D output image sequence to sequentially include a first left-viewpoint image, a first right-viewpoint image, a left-viewpoint intermediate image, a right-viewpoint intermediate image, a last left-viewpoint image, and a last right-viewpoint image, where a black image is further included between every two adjacent images.

If the third frame rate is four times the first frame rate, the 3D frame rate conversion unit 130 may generate a 3D output image sequence to sequentially include a first left-viewpoint image, a first right-viewpoint image, a left-viewpoint intermediate image, a right-viewpoint intermediate image, a last left-viewpoint image, and a last right-viewpoint image, where each of the first left-viewpoint image, the first right-viewpoint image, the left-viewpoint intermediate image, the right-viewpoint intermediate image, the last left-viewpoint image, and the last right-viewpoint image is continuously included twice.

The 3D frame rate conversion unit 130 may determine the left-viewpoint intermediate image to be a combination of a first left-viewpoint image and a last left-viewpoint image from among adjacent left-viewpoint images, and may determine the right-viewpoint intermediate image to be a combination of a first right-viewpoint image and last right-viewpoint image from among adjacent right-viewpoint images.

If the left-viewpoint intermediate image and the right-viewpoint intermediate image are respectively determined to be a first left-viewpoint image from among adjacent left-viewpoint images and a first right-viewpoint image from among adjacent right-viewpoint images, then the first left-viewpoint image and the first right-viewpoint image that are already stored in a memory may be directly used, and an additional memory is not needed in this case.

However, if the left-viewpoint intermediate image is determined to be a combination of the first left-viewpoint image and the last left-viewpoint image and the right-viewpoint intermediate image is determined to be a combination of the first right-viewpoint image and the last right-viewpoint image, then an additional memory is needed to store the combined results.

In an exemplary embodiment of the present invention, in the display device 100, the first frame rate may be 60 Hz or 50 Hz, and the second and third frame rates may be double the first frame rate, i.e., 120 Hz or 100 Hz, or four times the first frame rate, i.e., 240 Hz or 200 Hz.

Figure 2:
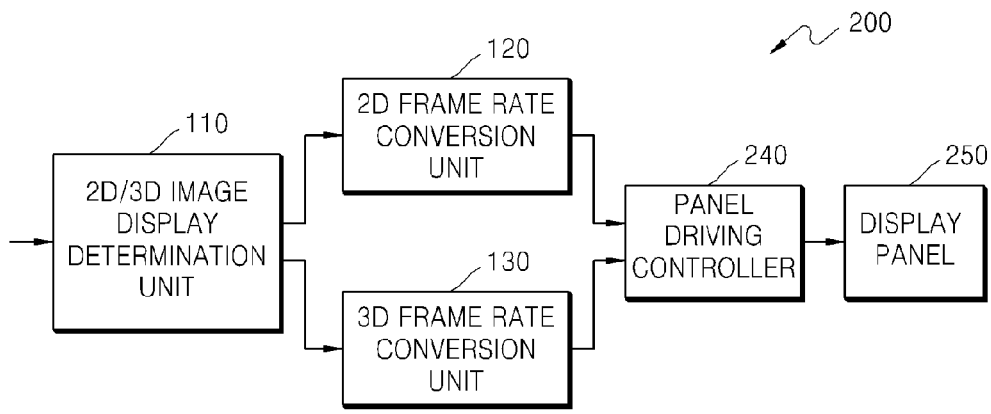
FIG. 2 is a block diagram of a display device for displaying a 2D/3D image according to another exemplary embodiment of the present invention.

FIG. 2 is a block diagram of a display device 200 for displaying a 2D/3D image according to another exemplary embodiment of the present invention. The display device 200 includes a 2D/3D image display determination unit 110, a 2D frame rate conversion unit 120, a 3D frame rate conversion unit 130, a panel driving controller 240 and a display panel 250. The display device 200 differs from display device 100 of FIG. 1 in that it further includes a panel driving controller 240 and a display panel 250.

The panel driving controller 240 drives the display panel 250 to display either a 2D output image sequence generated by the 2D frame rate conversion unit 120 or a 3D output image sequence generated by the 3D frame rate conversion unit 130, in synchronization with a second or third frame rate, respectively.

The display panel 250 may be a liquid crystal display (LCD) panel or an organic light emitting diode (OLED) panel, and displays the 2D output image sequence or the 3D output image sequence.

Figure 3:
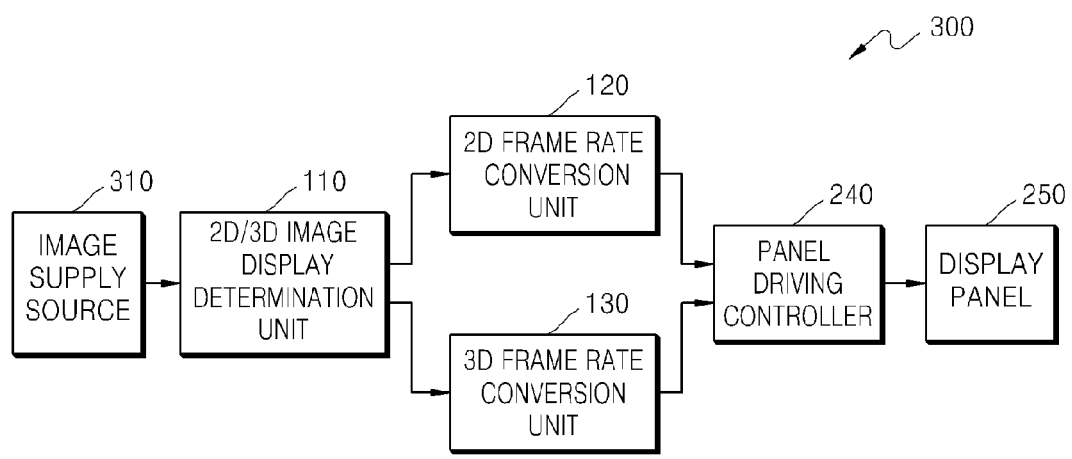
FIG. 3 is a block diagram of a system for displaying a 2D/3D image according to another exemplary embodiment of the present invention.

FIG. 3 is a block diagram of a system 300 for displaying a 2D/3D image according to another exemplary embodiment of the present invention. The system 300 includes an image supply source 310, a 2D/3D image display determination unit 110, a 2D frame rate conversion unit 120, a 3D frame rate conversion unit 130, a panel driving controller 240 and a display panel 250.

The system 300 differs from display device 100 of FIG. 1 in that it further includes the image supply source 310, the panel driving controller 240 and the display panel 250, and differs from display device 200 of FIG. 2 in that it further includes the image supply source 310.

The image supply source 310 supplies an image sequence at a first frame rate. The supplied image sequence may be either a 2D image sequence or a 3D image sequence that includes a left-viewpoint image sequence and a right-viewpoint image sequence. The image supply source 310 may be hardware module, mounted in the form of an image board, on the display device 300.

The display devices 100, 200 and 300 may selectively determine a 2D display mode or a 3D display mode, and perform image processing according to the determined display mode.

In the 2D display mode, a frame rate is controlled by combining intermediate images by using an input image sequence, thereby reducing a defect, e.g., motion blurring, which is likely to occur on a hold-type display, such as an LCD or an OLED.

A 3D image sequence includes both a left-viewpoint image sequence and a right-viewpoint image sequence. Thus, if consecutive images are combined in the order that they are input as in a 2D image sequence, left-viewpoint information and right-viewpoint information may be mixed, thus degrading 3D information.

Thus, in the 3D image sequence display mode, a left-viewpoint image and a right-viewpoint image may be sequentially displayed by repeatedly including an input image sequence or inserting a black image between every two adjacent images in the input image sequence, instead of combining intermediate images. If a frame rate of a 3D image sequence is controlled by combining intermediate images, the left-viewpoint intermediate images and right-viewpoint intermediate images are respectively combined in consideration of the order of a left-viewpoint image sequence and a right-viewpoint image sequence.

Figure 4:
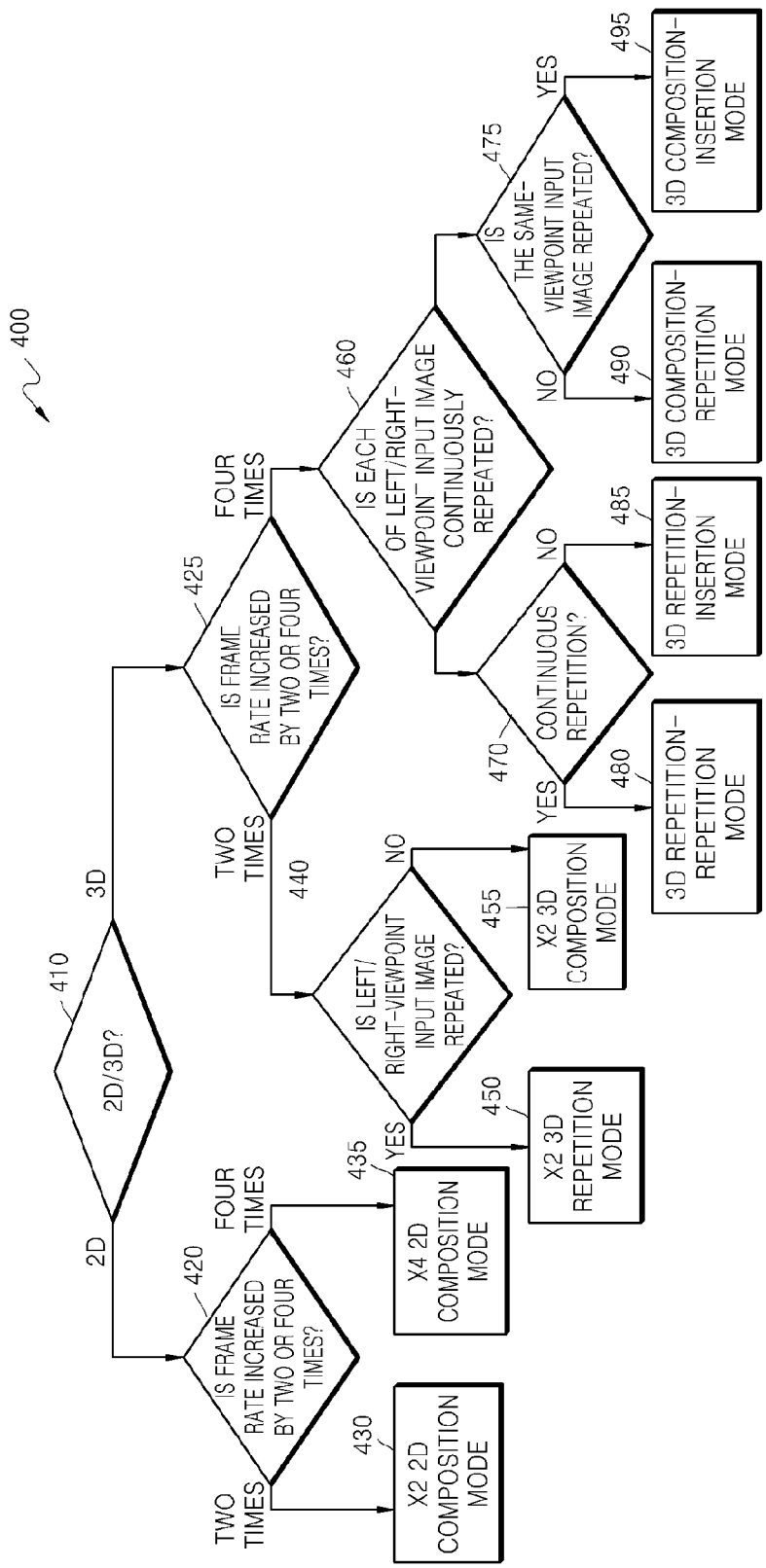
FIG. 4 is a flowchart illustrating a method of adjusting a frame rate of a 2D image sequence or a 3D image sequence according to an exemplary embodiment of the present invention.

FIG. 4 is a flowchart illustrating a method 400 of adjusting a frame rate of a 2D image sequence or a 3D image sequence according to an exemplary embodiment of the present invention. In an exemplary embodiment of the present invention, a frame rate is adjusted in consideration of (i) whether an input image sequence is a 2D input image sequence or a 3D input image sequence, (ii) an increase in a frame rate, (iii) a method of determining intermediate images, and iv) whether each image is continuously repeated.

In the flowchart of the method 400, a case where the frame rate of an output image sequence is to be increased by two times or four times that of an input image sequence is illustrated but the present invention is not limited thereto. If the frame rate of the output image sequence is double that of the input image sequence, the total number of images included in the output image sequence may also be double that of the images in the input image sequence. If the frame rate of the output image sequence is four times that of the input image sequence, the total number of the images included in the output image sequence may also be four times that of the images in the input image sequence.

More specifically, in operation 410, it is determined whether the input image sequence is a 2D image sequence or a 3D image sequence. If it is determined that the input image sequence is the 2D image sequence, the method proceeds to operation 420. If it is determined that the input image sequence is the 3D image sequence, the method proceeds to operation 425.

In operation 420, it is determined whether the frame rate of the output image sequence is to be increased by two times or four times that of the input image sequence. For example, when a 2D input image sequence having a frame rate of 60 Hz is input, operation 430 is performed in order to obtain a 2D output image sequence having a frame rate of 120 Hz. In order to obtain a 2D output image sequence having a frame rate of 240 Hz, operation 435 is performed.

In operation 430, the frame rate of the output image sequence is increased to be double that of the input image sequence (×2 2D composition mode). In an exemplary embodiment of the present invention, in order to double the frame rate of the output image sequence, 2D intermediate images may be determined to be displayed between consecutive images in the input image sequence. A 2D intermediate image may be obtained by combining two adjacent images. The ×2 2D composition mode will be described later with reference to FIG. 5A.

In operation 435, the frame rate of the output image sequence is increased to be four times that of the input image sequence (×4 2D composition mode). In the ×4 2D composition mode, three 2D intermediate images may be obtained by performing motion estimation or motion compensation on two consecutive images in the 2D input image sequence. The ×4 2D composition mode will be described later with reference to FIG. 5B.

In operation 425, it is determined whether the frame rate of the output image sequence is to be increased by two or four times that of the input image sequence. If the frame rate of the output image sequence is to be doubled, the method proceeds to operation 440, and if the frame rate is to be increased by four times, the method proceeds to operation 460.

In operation 440, a method of determining intermediate images that are to be inserted in order to double the frame rate of the output image sequence is determined. That is, it is determined whether to respectively determine a left/right-viewpoint intermediate image to be a left/right-viewpoint input image.

In operation 450, in order to double the frame rate of the output image sequence, a 3D output image sequence is generated to alternately and repeatedly include the left-viewpoint input image and the right-viewpoint input image (×2 3D repetition mode). The frame rate of the output image sequence may be doubled by obtaining intermediate images by alternately repeating a left-viewpoint input image and a right-viewpoint input image included in the 3D input image sequence. The ×2 3D repetition mode will be described later with reference to FIG. 6A.

In operation 455, in order to double the frame rate of the output image sequence, a left-viewpoint intermediate image is obtained by combining consecutive left-viewpoint input images in the input image sequence and a right-viewpoint intermediate image is obtained by combining consecutive right-viewpoint input images in the input image sequence, instead of directly repeating the images in the input image sequence (×2 3D composition mode). The ×2 3D composition mode will be described later with reference to FIG. 7A.

In operation 460, a method of determining intermediate images that are to be inserted in order to increase the frame rate of the output image sequence by four times is determined. In order to increase the frame rate of the output image sequence by four times, the frame rate may first be doubled by generating a left-viewpoint intermediate image or a right-viewpoint intermediate image. In operation 460, it is determined whether to determine a left-viewpoint intermediate image and a right-viewpoint intermediate image so that the left-viewpoint input image and the right-viewpoint input image may be alternately repeated.

In operations 470 and 475, in order to finally increase the frame rate of the output image sequence by four times, a method of further doubling the frame rates of the left-viewpoint image sequence and the right-viewpoint image sequence which were doubled by adding the left-viewpoint intermediate image and the right-viewpoint intermediate image in operation 460, is determined. In operations 470 and 475, it is determined whether a 3D output image sequence, the frame rate of which is increased by four times is to be generated by continuously repeating each image in a temporary left-viewpoint image sequence and a temporary right-viewpoint image sequence, the frame rates of which are doubled by adding the left-viewpoint intermediate image and the right-viewpoint intermediate image in operation 460.

In operation 480, in order to increase the frame rate of the output image sequence by four times, the temporary image sequence is generated by alternately repeating the left-viewpoint input image and the right-viewpoint input image, and a 3D output image sequence is obtained by continuously repeating each image included in the temporary image sequence (3D repetition-repetition mode). The 3D repetition-repetition mode will be described later with reference to FIG. 6C.

In operation 485, in order to increase the frame rate of the output image sequence by four times, the temporary image sequence, the frame rate of which is doubled, is generated by alternately repeating the left-viewpoint input image and the right-viewpoint input image. In order to increase the frame rate of the output image sequence by four times, a 3D output image sequence is generated by inserting a black image between every two adjacent images in the temporary image sequence, instead of continuously repeating each image in the temporary image sequence (3D repetition-insertion mode). The 3D repetition-insertion mode will be described later with reference to FIG. 6B.

In operation 490, in order to increase the frame rate of the output image sequence by four times, the temporary image sequence, the frame rate of which is doubled, is generated to include a left-viewpoint intermediate image which is a combination of adjacent left-viewpoint input images and to include a right-viewpoint intermediate image which is a combination of adjacent right-viewpoint input images, and then, a 3D output image sequence is generated by continuously repeating each image in the temporary image sequence (3D composition-repetition mode). The 3D composition-repetition mode will be described later with reference to FIG. 7C.

In operation 495, in order to increase the frame rate of the output image sequence by four times, the temporary image sequence is generated to include a left-viewpoint intermediate image which is a combination of adjacent left-viewpoint input images and a right-viewpoint intermediate image which is a combination of adjacent right-viewpoint input images, and then, a 3D output image sequence is generated by inserting a black image between every two adjacent images in the temporary image sequence, instead of repeating each image in the temporary image sequence (3D composition-insertion mode). The 3D composition-insertion mode will be described later with reference to FIG. 7B.

Figure 5B:
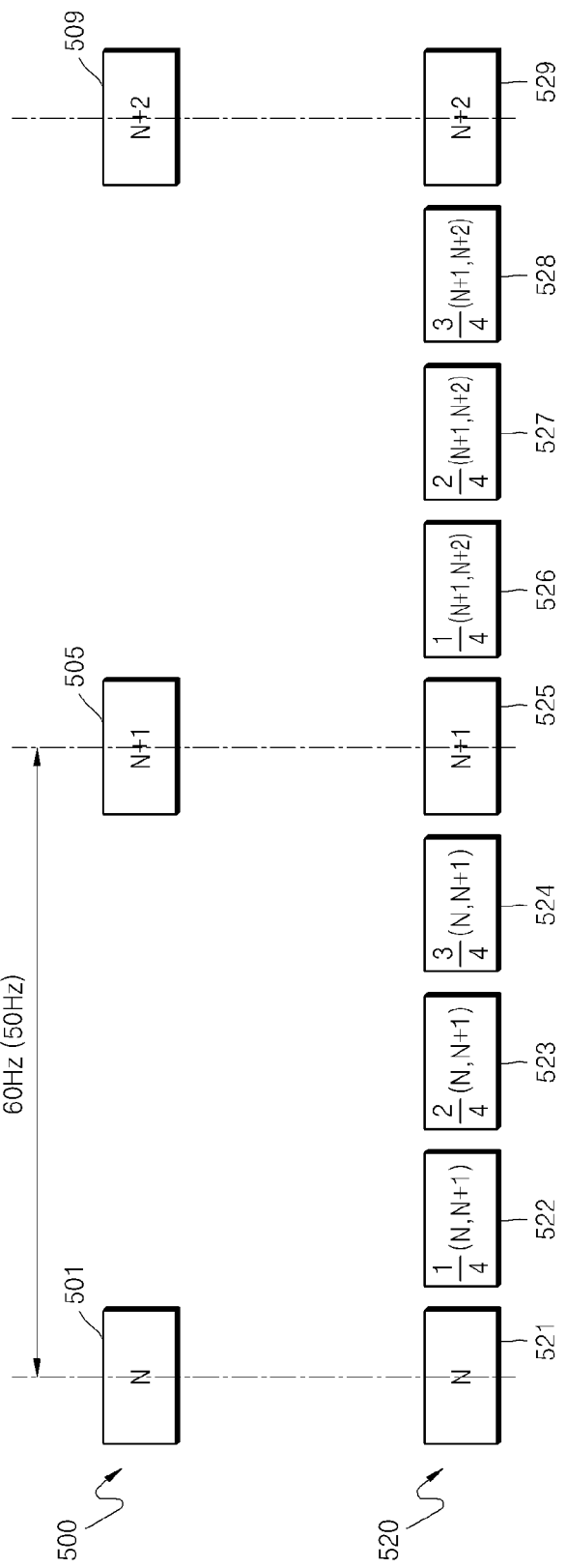
FIG. 5B illustrates a method of increasing the frame rate of a 2D image sequence by four times according to an exemplary embodiment of the present invention.

A method of adjusting a frame rate of a 2D image sequence and a method of synchronizing a 2D input image sequence with a 2D output image sequence according to an exemplary embodiment of the present invention, will now be described in detail with reference to FIGS. 5A and 5B. The methods of FIGS. 5A and 5B are related to the operations of the 2D frame rate conversion unit 120 and the panel driving controller 240 of FIG. 1, 2 or 3.

In a method of adjusting the frame rate of a 2D input image sequence according to an exemplary embodiment of the present invention, 2D intermediate images are determined to be displayed between images included in the 2D input image sequence in order to generate a 2D output image sequence, the frame rate of which is doubled. The 2D output image sequence includes the images in the 2D input image sequence and the 2D intermediate images.

FIG. 5A illustrates a method of doubling the frame rate of a 2D image sequence according to an exemplary embodiment of the present invention. FIG. 5A illustrates in detail the ×2 2D composition mode which is performed in operation 430 in the method of FIG. 4.

In FIG. 5A, a plurality of input images 501, 505 and 509 are respectively an $N^{th}$ image, an $(N+1)^{th}$ image, and an $(N+2)^{th}$ image included in a 2D input image sequence 500 having a frame rate of 60 Hz. A plurality of output images 511, 513, 515, 517 and 519 belong to a 2D output image sequence 510 having a frame rate of 120 Hz.

The output images 511, 515 and 519 are respectively the same as the $N^{th}$ image 501, the $(N+1)^{th}$ image 505, and the $(N+2)^{th}$ image 509 in the 2D input image sequence 500, and are synchronized to be displayed at the same point of time.

The output image 513 is an intermediate image to be displayed between the adjacent output images 511 and 515, and the output image 517 is an intermediate image to be displayed between the adjacent output images 515 and 519. Since the frame rate of the 2D output image sequence 510 is doubled, only one intermediate image is generated between each of pairs of adjacent images.

A $\frac{1}{2}(X,Y)^{th}$ image denotes an image obtained by combining an $X^{th}$ image and an $Y^{th}$ image. In an exemplary embodiment of the present invention, a 2D intermediate image may be obtained by performing motion estimation or motion compensation on adjacent input images. Thus, the intermediate image 513 is obtained by performing motion estimation or motion compensation on the output images 511 and 515, and the intermediate image 517 may be obtained by performing motion estimation or motion compensation on the output images 515 and 519.

The 2D frame rate conversion unit 120 may generate a 2D output image sequence 510, the frame rate is double that of the 2D input image sequence 500 according to the ×2 2D composition mode, and the panel driving controller 240 may drive the display panel 250 of FIG. 2 or 3 to display the 2D output image sequence 510 at a frame rate of 120 Hz. Therefore, the 2D output image sequence 510 having the frame rate of 120 Hz may be displayed in synchronization with the 2D input image sequence 500 having a frame rate of 60 Hz.

FIG. 5B illustrates a method of increasing the frame rate of a 2D image sequence by four times according to an exemplary embodiment of the present invention. FIG. 5B illustrates in detail the ×4 2D composition mode which is performed in operation 435 included in the method of FIG. 4.

A plurality of input images 501, 505 and 509 are respectively an $N^{th}$ image, an $(N+1)^{th}$ image and an $(N+2)^{th}$ image included in a 2D input image sequence 500 having a frame rate of 60 Hz. A plurality of output images 521 through 529 belong to a 2D output image sequence 520 having a frame rate of 240 Hz.

The output images 521, 525 and 529 are respectively the same as the $N^{th}$ image 501, the $(N+1)^{th}$ image 505 and the $(N+2)^{th}$ image 509 included in the 2D input image sequence 500, and are synchronized to be displayed at the same point of time.

The output images 522 through 524 are intermediate images to be sequentially displayed between the output images 521 and 525. The output images 526 through 528 are intermediate images to be sequentially displayed between the output images 525 and 529. Since the frame rate of the 2D output image sequence 520 is increased by four times, three intermediate images are generated between each of pairs of adjacent images in input images.

A $¼(X,Y)^{th}$ image, a $²⁄₄(X,Y)^{th}$ image and a $¾(X,Y)^{th}$ image respectively denote first, second and third images obtained by combining an $X^{th}$ image with a $Y^{th}$ image. The intermediate images 522 through 524 are obtained by performing motion estimation or motion compensation on the output images 521 and 525, and the intermediate image 526 through 528 are obtained by performing motion estimation or motion compensation on the output images 525 and 529.

The 2D frame rate conversion unit 120 may generate a 2D output image sequence 520, the frame rate of which is four times that of the 2D input image sequence 500 according to the ×4 2D composition mode, and the panel driving controller 240 may drive the display panel 250 to display the 2D output image sequence 520 at a frame rate of 240 Hz. Accordingly, the 2D output image sequence 520 having the frame rate of 240 Hz may be displayed in synchronization with the 2D input image sequence 500 having the frame rate of 60 Hz.

A method of adjusting a frame rate of a 3D image sequence and a method of synchronizing a 3D input image sequence with a 3D output image sequence according to an exemplary embodiment of the present invention, will now be described in detail with reference to FIGS. 6A through 7C. The methods of FIGS. 6A through 7C are related to the operations of the 3D frame rate conversion unit 130 and the panel driving controller 240 of FIG. 1, 2 or 3.

Figure 6A:
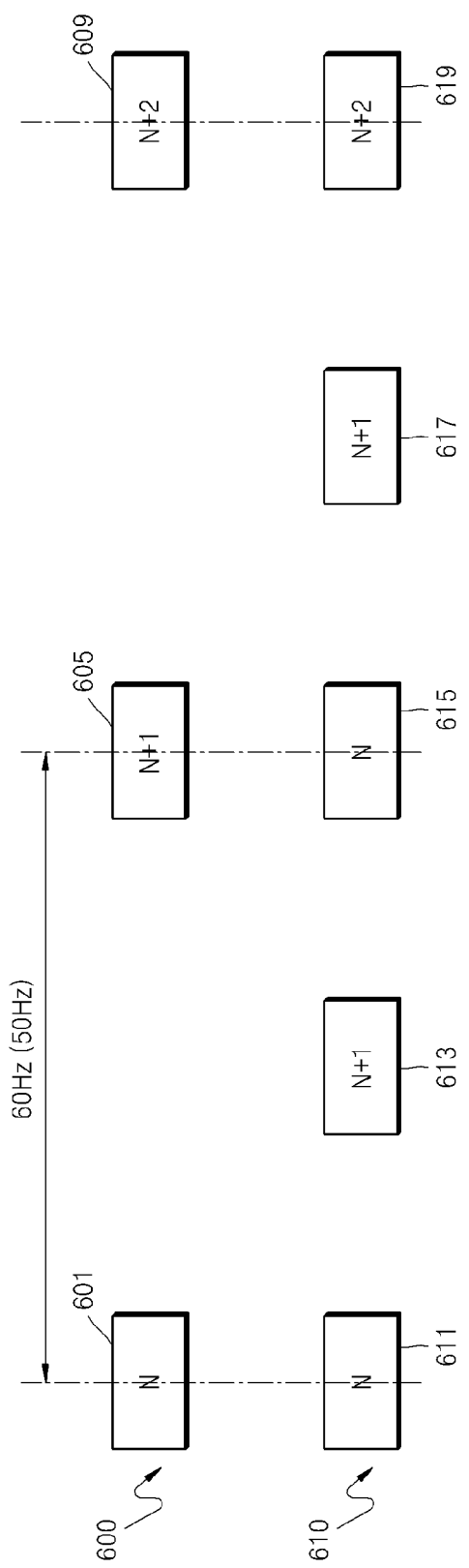
FIG. 6A illustrates a method of doubling the frame rate of a 3D image sequence according to an exemplary embodiment of the present invention.
Figure 6B:
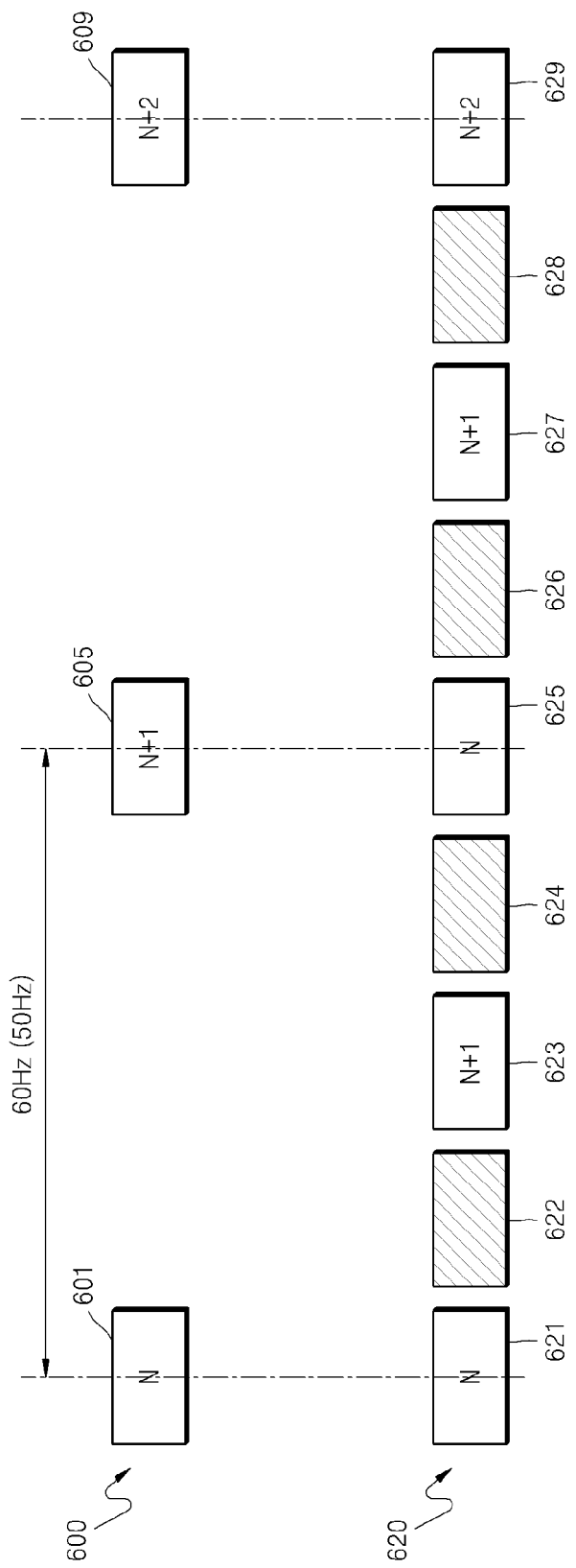
FIG. 6B illustrates a method of increasing the frame rate of a 3D image sequence by four times according to an exemplary embodiment of the present invention.
Figure 6C:
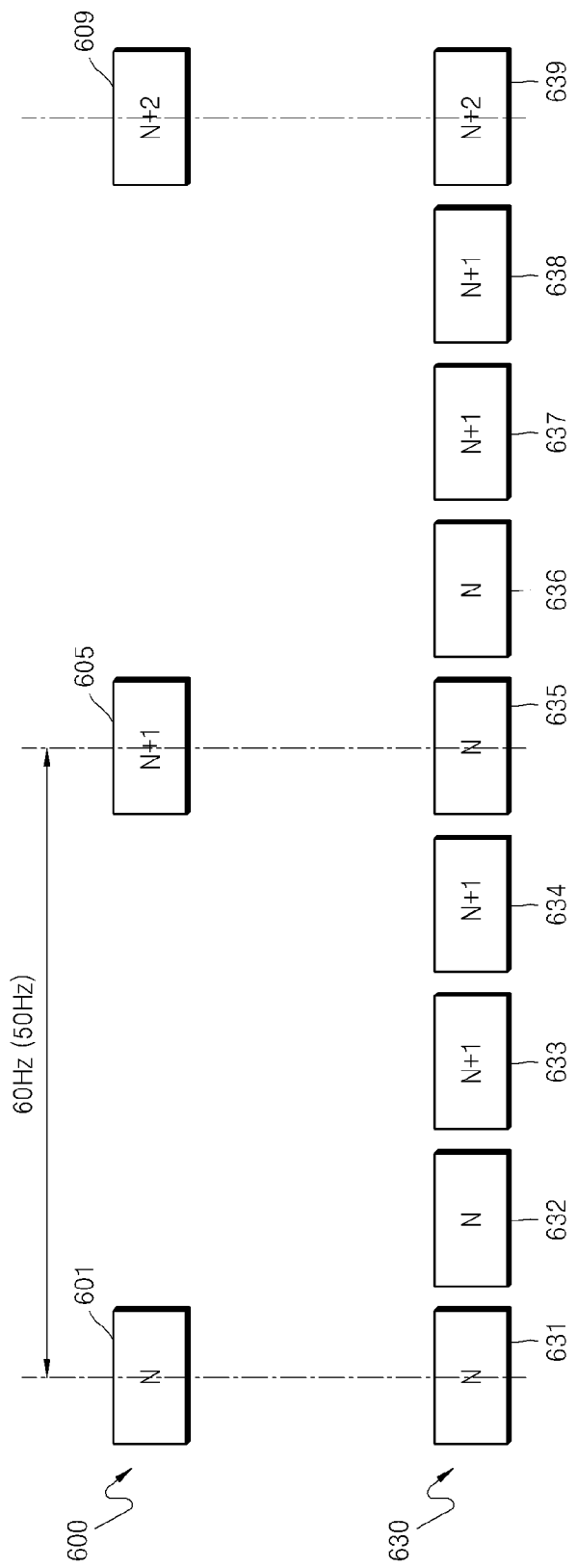
FIG. 6C illustrates a method of increasing the frame rate of a 3D image sequence by four times according to another exemplary embodiment of the present invention.
Figure 7B:
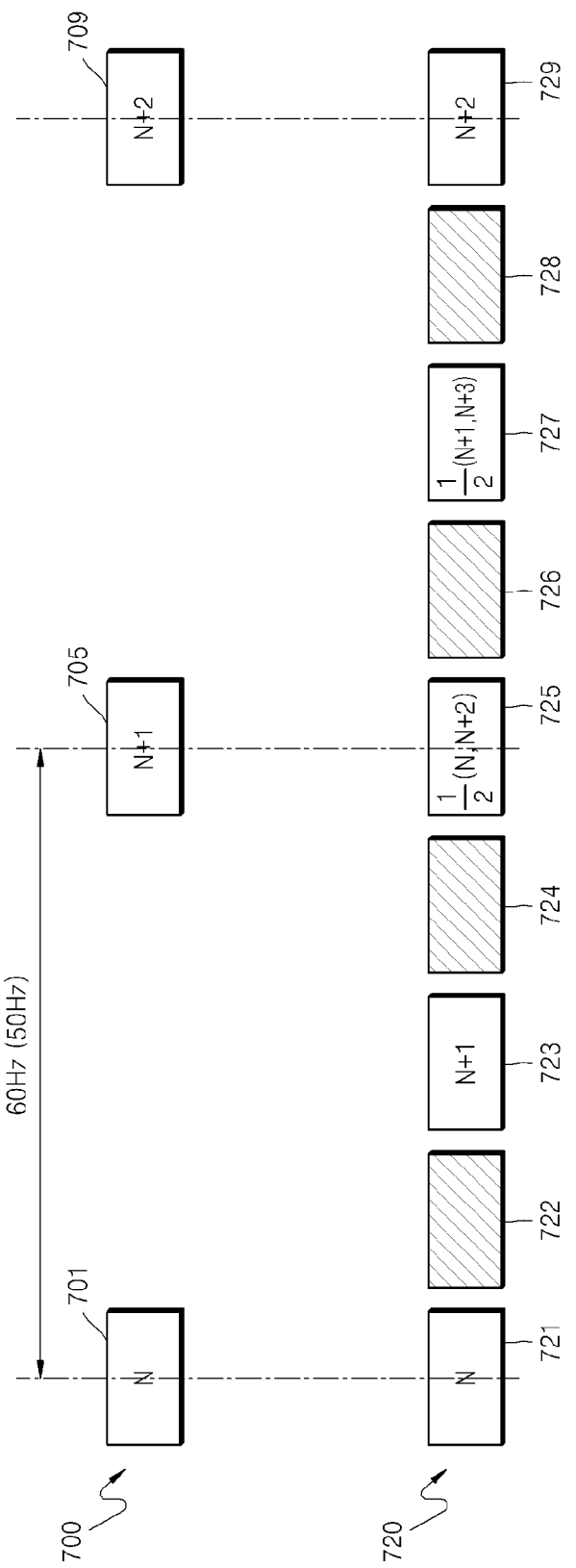
FIG. 7B illustrates a method of increasing the frame rate of a 3D image sequence by four times according to another exemplary embodiment of the present invention.
Figure 7C:
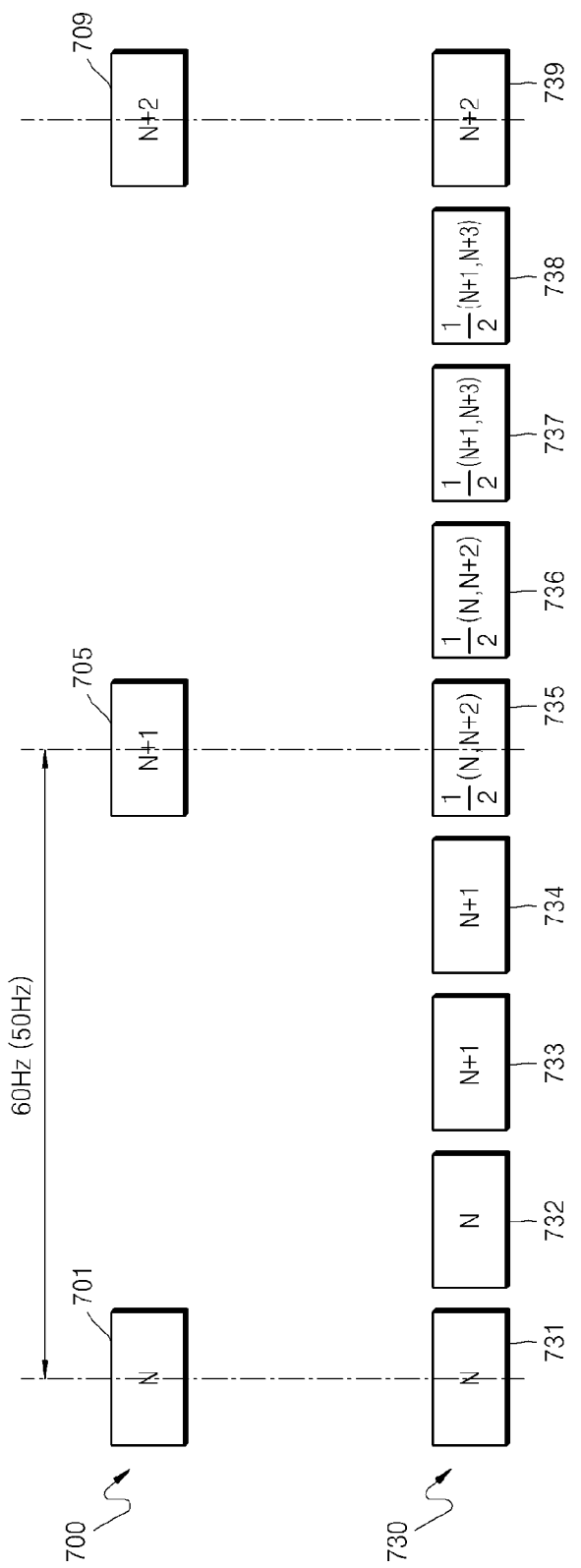
FIG. 7C illustrates a method of increasing the frame rate of a 3D image sequence by four times according to another exemplary embodiment of the present invention.

More specifically, in the methods of FIGS. 6A through 6C, a left-viewpoint intermediate image and a right-viewpoint intermediate image are generated by repeating a left-viewpoint image and a right-viewpoint image included in a 3D input image sequence in order to obtain a 3D output image sequence in which the left-viewpoint input image and the right-viewpoint input image are repeatedly included. In the methods of FIGS. 7A through 7C, a 3D output image sequence having a left-viewpoint intermediate image and a right-viewpoint intermediate image is obtained by combining a plurality of left-viewpoint input images and a plurality of right-viewpoint input images, instead of repeatedly including a left-viewpoint image and a right-viewpoint image in a 3D input image sequence.

FIG. 6A illustrates a method of doubling the frame rate of a 3D image sequence according to an exemplary embodiment of the present invention. FIG. 6A illustrates in detail the 2×3D repetition mode which is performed in operation 450 of the method of FIG. 4.

A plurality of input images 601, 605 and 609 are respectively an $N^{th}$ image, an $(N+1)^{th}$ image and an $(N+2)^{th}$ image included in a 3D input image sequence 600 having a frame rate of 60 Hz. In the 3D input image sequence 600, a left-viewpoint image and a right-viewpoint image are alternately included. Thus, the 3D input image sequence 600 may be divided into a left-viewpoint input image sequence and a right-viewpoint input image sequence. For example, if the $N^{th}$ image 601 and the $(N+2)^{th}$ image 609 belong to the left-viewpoint input image sequence, the $(N+1)^{th}$ image 605 and an $(N+3)^{th}$ image (not shown) belong to the right-viewpoint input image sequence.

A plurality of output images 611, 613, 615, 617 and 619 belong to a 3D output image sequence 610 having a frame rate of 120 Hz. Since a left-viewpoint image and a right-viewpoint image are alternately included in the 3D output image sequence 610, a plurality of output images 611, 615 and 619 may be left-viewpoint output images and a plurality of output images 613 and 617 may be right-viewpoint output images. Thus, the left-viewpoint output image sequence includes the left-viewpoint output images 611, 615 and 619 and the right-viewpoint output image sequence includes the right-viewpoint outputs images 613 and 617.

Since the frame rate of the 3D output image sequence 610 is double that of the 3D input image sequence 600, only one left-viewpoint intermediate image is generated between each of pairs of adjacent left-viewpoint input images. Likewise, only one right-viewpoint intermediate image is generated between each of pairs of adjacent right-viewpoint input images.

A left-viewpoint intermediate image of the left-viewpoint image sequence and a right-viewpoint intermediate image of the right-viewpoint image sequence are individually generated. The left-viewpoint output image 615 is a left-viewpoint intermediate image to be displayed between the left-viewpoint output image 611 and the left-viewpoint output image 619 that respectively correspond to the $N^{th}$ image 601 and the $(N+2)^{th}$ image 609 that are consecutively included in the left-viewpoint input image sequence. The right-viewpoint output image 617 is a right-viewpoint intermediate image to be displayed between the consecutive $(N+1)^{th}$ image 613 and an $(N+3)^{th}$ image (not shown) that are consecutively included in the right-viewpoint output image sequence.

The left-viewpoint output images 611 and 619 are respectively the same as the $N^{th}$ image 601 and the $(N+2)^{th}$ image 609 in the left-viewpoint input image sequence. Also, the right-viewpoint output image 613 corresponds to the left-viewpoint output image 611 and is thus the same as the $(N+1)^{th}$ image 605 which is a right-viewpoint input image corresponding to the $N^{th}$ image 601 which is a left-viewpoint input image.

In the ×2 3D repetition mode, a left-viewpoint intermediate image is selected as a first image from among adjacent images included in the left-viewpoint output image sequence. Likewise, a right-viewpoint intermediate image is selected as a first image from among adjacent images included in the right-viewpoint output image sequence.

That is, the left-viewpoint intermediate image 615 is determined to be the same as the $N^{th}$ left-viewpoint output image 611 which is a first image from among the $N^{th}$ left-viewpoint output image 611 and the $(N+2)^{th}$ left-viewpoint output image 619. The right-viewpoint intermediate image 617 is determined to be the same as the $(N+1)^{th}$ right-viewpoint output image 613 which is a first image from among the $(N+1)^{th}$ right-viewpoint output image 613 and $(N+3)^{th}$ right-viewpoint output image (not shown).

Thus, the 3D output image sequence 610 may be generated to alternately and repeatedly include the N$^{th}$ left-viewpoint input image 601 and the (N+1)$^{th}$ right-viewpoint input image 605 in the 3D input image sequence 600. Also, while the left-viewpoint input image 601 and the right-viewpoint input image 605 are displayed, the left-viewpoint output image 611, the right-viewpoint output image 613, the left-viewpoint output image 615 and the right-viewpoint output image 617 may be synchronized to be sequentially displayed, so that the frame rate of the 3D output image sequence 610 may be double that of the 3D input image sequence 600.

The 3D frame rate conversion unit 130 may generate the 3D output image sequence 610, the frame rate of which is double that of the 3D input image sequence 600 according to the ×2 3D repetition mode, and the panel driving controller 240 may drive the display panel 250 to display the 3D output image sequence 610 at a frame rate of 120 Hz. Therefore, the 3D output image sequence 610 having the frame rate of 120 Hz may be displayed in synchronization with the 3D input image sequence 600 having the frame rate of 60 Hz.

FIG. 6B illustrates a method of increasing the frame rate of a 3D image sequence by four times according to an exemplary embodiment of the present invention. FIG. 6B illustrates in detail the 3D repetition-insertion mode which is performed in operation 485 of the method of FIG. 4.

A plurality of output images 621 through 629 belong a 3D output image sequence 620 having a frame rate of 240 Hz.

In order to obtain a 3D output image sequence 620, the frame rate of which is four times that of a 3D input image sequence 600, a temporary image sequence, the frame rate of which is double that of a 3D input image sequence 600, is first generated. The temporary image sequence may be the same as the 3D output image sequence 610 of FIG. 6A. In the 3D output image sequence 620 having the frame rate of 240 Hz, a black image is further inserted between every two adjacent images included in the temporary image sequence having a frame rate of 120 Hz.

That is, the left-viewpoint output image 621, the right-viewpoint output image 623, the left-viewpoint output image 625, the right-viewpoint output image 627, and the left-viewpoint output image 629 in the 3D output image sequence 620 are determined to be respectively the same as the left-viewpoint image 611, the right-viewpoint image 613, the left-viewpoint image 615, the right-viewpoint image 617, and the left-viewpoint image 619 included in the 3D output image sequence 610 (the temporary image sequence).

Further, a black image 622 may be inserted between the left-viewpoint output image 621 and the right-viewpoint output image 623, a black image 624 may be inserted between the right-viewpoint output image 623 and the left-viewpoint output image 625, a black image 626 may be inserted between the left-viewpoint output image 625 and the right-viewpoint output image 627, and a black image 628 may be inserted between the right-viewpoint output image 627 and the left-viewpoint output image 629.

While the left-viewpoint input image 601 and the right-viewpoint input image 605 are displayed, the left-viewpoint output image 621, the black image 622, the right-viewpoint output image 623, the black image 624, the left-viewpoint output image 625, the black image 626, the right-viewpoint output image 627 and the black image 628 may be synchronized to be sequentially displayed, so that the frame rate of the 3D output image sequence 620 may be four times that of the 3D input image sequence 600.

The 3D frame rate conversion unit 130 may generate the 3D output image sequence 620, the frame rate of which is four times that of the 3D input image sequence 600 according to the 3D repetition-insertion mode, and the panel driving controller 240 may drive the display panel 250 to display the 3D output image sequence 620 at the frame rate of 240 Hz. Accordingly, the 3D output image sequence 620 having the frame rate of 240 Hz may be displayed in synchronization with the 3D input image sequence 600 having a frame rate of 60 Hz.

FIG. 6C illustrates a method of increasing the frame rate of a 3D image sequence by four times according to another exemplary embodiment of the present invention. FIG. 6C illustrates in detail the 3D repetition-repetition mode which is performed in operation 480 of the method of FIG. 4.

A plurality of output images 631 through 639 belong to a 3D output image sequence 630 having a frame rate of 240 Hz.

In order to obtain the 3D output image sequence 630, the frame rate of which is four times that of a 3D input image sequence, a temporary image sequence, the frame rate of which is double the 3D input image sequence, is first generated. The temporary image sequence may be the same as the 3D output image sequence 610 of FIG. 6A. In the 3D output image sequence 630 having the frame rate of 240 Hz, each image of the temporary image sequence having the frame rate of 120 Hz is continuously repeatedly included.

That is, the left-viewpoint output image 631, the right-viewpoint output image 633, the left-viewpoint output image 635, the right-viewpoint output image 637, and the left-viewpoint output image 639 in the 3D output image sequence 630 are determined to be respectively the same as the left-viewpoint image 611, the right-viewpoint image 613, the left-viewpoint image 615, the right-viewpoint image 617, and the left-viewpoint image 619 in the 3D input image sequence 610 (the temporary image sequence).

Further, the left-viewpoint output image 632 may be the same as the left-viewpoint output image 631 so that left-viewpoint output image 631 may appear between the left-viewpoint output image 631 and the right-viewpoint output image 633. The right-viewpoint output image 634 may be the same as the right-viewpoint output image 633 so that the right-viewpoint output image 633 may appear between the right-viewpoint output image 633 and the left-viewpoint output image 635. The left-viewpoint output image 636 may be the same as the left-viewpoint output image 635 so that the left-viewpoint output image 635 may appear between the left-viewpoint output image 635 and the right-viewpoint output image 637. The right-viewpoint output image 638 may be the same as the right-viewpoint output image 637 so that the right-viewpoint output image 637 may appear between the right-viewpoint output image 637 and the left-viewpoint output image 639.

While the left-viewpoint input image 601 and the right-viewpoint input image 605 are displayed, the left-viewpoint output image 631, the left-viewpoint output image 632, the right-viewpoint output image 633, the right-viewpoint output image 634, the left-viewpoint output image 635, the left-viewpoint output image 636, the right-viewpoint output image 637 and the right-viewpoint output image 638 may be synchronized to be sequentially displayed, so that the frame rate of the 3D output image sequence 630 may be four times that of the 3D input image sequence 600.

The 3D frame rate conversion unit 130 may generate the 3D output image sequence 630, the frame rate of which is four times that of the 3D input image sequence 600 according to the 3D repetition-repetition mode, and the panel driving controller 240 may drive the display panel 250 to display the 3D output image sequence 630 at the frame rate of 240 Hz. Accordingly, the 3D output image sequence 630 having the frame rate of 240 Hz may be displayed in synchronization with the 3D input image sequence 600 having a frame rate of 60 Hz.

FIGS. 7A to 7C illustrate methods of generating a 3D output image sequence having a left-viewpoint intermediate image and a right-viewpoint intermediate image that are respectively obtained by combining a plurality of left-viewpoint input images and a plurality of right-viewpoint input images instead of repeatedly including a left-viewpoint image and a right-viewpoint image in a 3D input image sequence, according to exemplary embodiments of the present invention.

FIG. 7A illustrates a method of doubling the frame rate of a 3D image sequence according to another exemplary embodiment of the present invention. FIG. 7A illustrates in detail the ×2 3D composition mode performed in operation 455 of the method of FIG. 4.

A plurality of input images 701, 705 and 709 are respectively an $N^{th}$ image, an $(N+1)^{th}$ image and an $(N+2)^{th}$ image included in a 3D input image sequence 700 having a frame rate of 60 Hz. If the $N^{th}$ image 701 and the $(N+2)^{th}$ image 709 belong to a left-viewpoint input image sequence, the $(N+1)^{th}$ image 705 and an $(N+3)^{th}$ image (not shown) belong to a right-viewpoint input image sequence.

A plurality of output images 711, 713, 715, 717 and 719 belong to a 3D output image sequence 710 having a frame rate of 120 Hz. In the 3D output image sequence 710, the output images 711, 715 and 719 may be left-viewpoint output images and the output images 713 and 717 may be right-viewpoint output images. Thus, the left-viewpoint output image sequence includes the output images 711, 715 and 719, and the right-viewpoint output image sequence includes the output images 713 and 717.

The left-viewpoint output image 715 is a left-viewpoint intermediate image to be displayed between the left-viewpoint output images 711 and 719 that respectively correspond to the consecutive $N^{th}$ image 701 and $(N+2^{th})$ image 709 of the left-viewpoint input image sequence. The right-viewpoint output image 717 is a right-viewpoint intermediate image to be displayed between the $(N+1)^{th}$ image 713 and the $(N+3)^{th}$ image (not shown) of the right-viewpoint output image sequence.

The left-viewpoint output image 711 and the left-viewpoint output image 719 are respectively the same as the $N^{th}$ image 701 and the $(N+2)^{th}$ image 709 of the left-viewpoint input image sequence. The right-viewpoint output image 713 corresponds to the left-viewpoint output image 711 and thus is the same as the $(N+1)^{th}$ image 705 which is a right-viewpoint input image corresponding to the $N^{th}$ image 701 which is a left-viewpoint input image.

In the ×2 3D composition mode, a left-viewpoint intermediate image is determined to be an image obtained by combining adjacent two images of a left-viewpoint output image sequence. Likewise, a right-viewpoint intermediate image is determined to be an image obtained by combining adjacent two images of a right-viewpoint output image sequence.

For example, the left-viewpoint intermediate image 715 is obtained by combining the $N^{th}$ left-viewpoint output image 711 and the $(N+2)^{th}$ left-viewpoint output image 719 by using motion estimation or motion compensation, and the right-viewpoint intermediate image 717 is obtained by combining the $(N+1)^{th}$ right-viewpoint output image 713 and an $(N+3)^{th}$ right-viewpoint output image (not shown) by using motion estimation or motion compensation.

While the left-viewpoint input image 701 and the right-viewpoint input image 705 are displayed, the left-viewpoint output image 711, the right-viewpoint output image 713, the left-viewpoint output image 715 and the right-viewpoint output image 717 may be synchronized to be sequentially displayed, so that the frame rate of the 3D output image sequence 710 may be double that of the 3D input image sequence 700.

The 3D frame rate conversion unit 130 may generate the 3D output image sequence 710, the frame rate of which is double that of the 3D input image sequence 700 according the ×2 3D composition mode, and the panel driving controller 240 may drive the display panel 250 to display the 3D output image sequence 710 at the frame rate of 120 Hz. Accordingly, the 3D output image sequence 710 having the frame rate of 120 Hz may be displayed in synchronization with the 3D input image sequence 700 having a frame rate of 60 Hz.

FIG. 7B illustrates a method of increasing the frame rate of a 3D image sequence by four times according to another exemplary embodiment of the present invention. FIG. 7B illustrates in detail the 3D composition-insertion mode performed in operation 495 of the method of FIG. 4.

A plurality of output images 721 through 729 belong to a 3D output image sequence 720 having a frame rate of 240 Hz.

In order to generate the 3D output image sequence 720, the frame rate of which is four times that of a 3D input image 700, a temporary image sequence, the frame rate of which is double that of the 3D input image 700 is first generated. The temporary image sequence may be the same as the 3D output image sequence 710 of FIG. 7A. In the 3D output image sequence 720 having the frame rate of 240 Hz, a black image is inserted between every two adjacent images included in the temporary image sequence having the frame rate of 120 Hz.

That is, the left-viewpoint output image 721, the right-viewpoint output image 723, the left-viewpoint output image 725, the right-viewpoint output image 727, and the left-viewpoint output image 729 in the 3D output image sequence 720, are respectively the same as the left-viewpoint image 711, the right-viewpoint image 713, the left-viewpoint image 715, the right-viewpoint image 717, and the left-viewpoint image 719 in the 3D image sequence 710 (the temporary image sequence).

A black image 722 may be inserted between the left-viewpoint output image 721 and the right-viewpoint output image 723, a black image 724 may be inserted between the right-viewpoint output image 723 and the left-viewpoint output image 725, a black image 726 may be inserted between the left-viewpoint output image 725 and the right-viewpoint output image 727, and a black image 728 may be inserted between the right-viewpoint output image 727 and the left-viewpoint output image 729.

While the left-viewpoint input image 701 and the right-viewpoint input image 705 are displayed, the left-viewpoint output image 721, the black image 722, the right-viewpoint output image 723, the black image 724, the left-viewpoint output image 725, the black image 726, the right-viewpoint output image 727 and the black image 728 may be synchronized to be sequentially displayed, so that the frame rate of the 3D output image sequence 720 may be four times that of the 3D input image sequence 700.

The 3D frame rate conversion unit 130 may generate the 3D output image sequence 720, the frame rate of which is four times that of the 3D input image sequence 700 according to the 3D composition-insertion mode, and the panel driving controller 240 may drive the display panel 250 to display the 3D output image sequence 720 at the frame rate of 240 Hz. Accordingly, the 3D output image sequence 720 having the frame rate of 240 Hz may be displayed in synchronization with the 3D input image sequence 700 having the frame rate of 60 Hz.

FIG. 7C illustrates a method of increasing the frame rate of a 3D image sequence by four times according to another exemplary embodiment of the present invention. FIG. 7C illustrates in detail the 3D composition-repetition mode performed in operation 490 of the method of FIG. 4.

A plurality of output images 731 through 739 belong to a 3D output image sequence 730 having a frame rate of 240 Hz.

In order to obtain the 3D output image sequence 730, the frame rate of which is four times that of a 3D input image 700, a temporary image sequence, the frame rate of which is double that of the 3D input image 700, is first generated. The temporary image sequence may be the same as the 3D output image sequence 710 of FIG. 7A. In the 3D output image sequence 730 having the frame rate of 240 Hz, each image in the temporary image sequence having the frame rate of 120 Hz is continuously and repeatedly included.

That is, the left-viewpoint output image 731, the right-viewpoint output image 733, the left-viewpoint output image 735, the right-viewpoint output image 737, and the left-viewpoint output image 739 of the 3D output image sequence 730, are respectively determined to be the same as the left-viewpoint image 711, the right-viewpoint image 713, the left-viewpoint image 715, the right-viewpoint image 717, and the left-viewpoint image 719 in the image sequence 710 (the temporary image sequence).

The left-viewpoint output image 732 may be determined to be the same as the left-viewpoint output image 731 so that the left-viewpoint output image 731 may appear between the left-viewpoint output image 731 and the right-viewpoint output image 733. The right-viewpoint output image 734 may be determined to be the same as the right-viewpoint output image 733 so that the right-viewpoint output image 733 may appear between the right-viewpoint output image 733 and the left-viewpoint output image 735. The left-viewpoint output image 736 may be determined to be the same as the left-viewpoint output image 735 so that the left-viewpoint output image 735 may appear between the left-viewpoint output image 735 and the right-viewpoint output image 737. The right-viewpoint output image 738 may be determined to be the same as the right-viewpoint output image 737 so that the right-viewpoint output image 737 may appear between the right-viewpoint output image 737 and the left-viewpoint output image 739.

While the left-viewpoint input image 701 and the right-viewpoint input image 705 are displayed, the left-viewpoint output image 731, the left-viewpoint output image 732, the right-viewpoint output image 733, the right-viewpoint output image 734, the left-viewpoint output image 735, the left-viewpoint output image 736, the right-viewpoint output image 737 and the right-viewpoint output image 738 may be synchronized to be sequentially displayed so that the frame rate of the 3D output image sequence 730 may be four times that of the 3D input image sequence 700.

Figure 8:
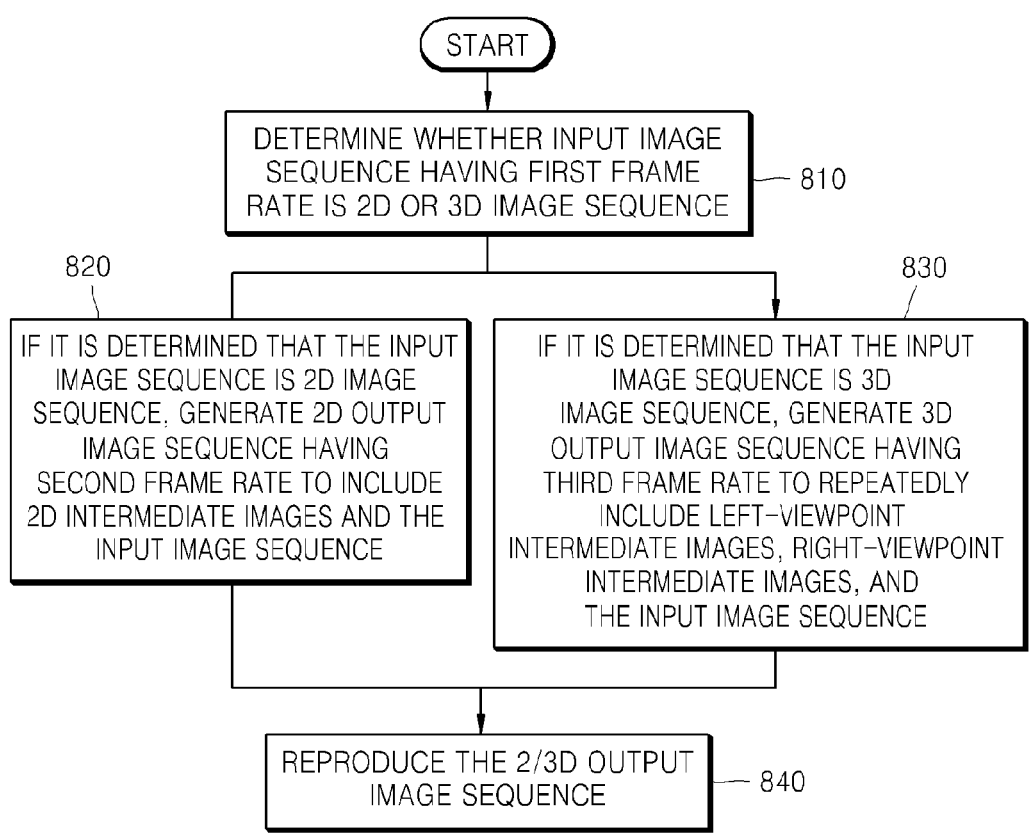
FIG. 8 is a flowchart illustrating a method of displaying a 2D/3D image according to an exemplary embodiment of the present invention.

The 3D frame rate conversion unit 130 may generate the 3D output image sequence 730, the frame rate of which is four times that of the 3D input image sequence 700 according to the 3D composition-repetition mode, and the panel driving controller 240 may drive the display panel 250 to display the 3D output image sequence 730 at the frame rate of 240 Hz. Accordingly, the 3D output image sequence 730 having the frame rate of 240 Hz may be displayed in synchronization with the 3D input image sequence 700 having the frame rate of 60 Hz, FIG. 8 is a flowchart illustrating a method of displaying a 2D/3D image according to an exemplary embodiment of the present invention. In operation 810, it is determined whether an input image sequence having a first frame rate is a first input image sequence which is a 2D image sequence or a second input image sequence which is a 3D image sequence. The first frame rate may be 60 Hz or 50 Hz. If a second or third frame rate is double the first frame rate, the second or third frame rate may be 120 Hz or 100 Hz. If the second or third frame rate is four times the first frame rate, the second or third frame rate may be 240 Hz or 200 Hz. Whether the input image sequence is the first or second image sequence may be either determined by analyzing the input image sequence or determined manually according to an external input.

In operation 820, if it is determined in operation 810 that the input image sequence is the first image sequence, a 2D output image sequence having the second frame rate may be generated to include a plurality of 2D intermediate images obtained from the first input image sequence, and to include the first input image sequence. The 2D intermediate images may be obtained by combining adjacent images by using motion estimation or motion compensation.

In operation 830, if it is determined in operation 810 that the input image sequence is the second image sequence, a 3D output image sequence having a third frame rate may be generated to repeatedly include left-viewpoint intermediate images, right-viewpoint intermediate images and the second input image sequence. Here, the left-viewpoint intermediate images are determined using at least one left-viewpoint image from a left-viewpoint image sequence included in the second input image sequence, and the right-viewpoint intermediate images are determined using at least one right-viewpoint image from a right-viewpoint image sequence in the second input image sequence.

Each of the left-viewpoint intermediate images may be determined to be a first left-viewpoint image from among adjacent left-viewpoint images in the left-viewpoint image sequence, and each of the right-viewpoint intermediate images may be determined to be a first right-viewpoint image from among adjacent right-viewpoint images in the right-viewpoint image sequence. Otherwise, each of the left-viewpoint intermediate images may be obtained by combining adjacent left-viewpoint images in the left-viewpoint image sequence by using motion estimation or motion compensation, and each of the right-viewpoint intermediate images may be obtained by combining adjacent right-viewpoint images in the right-viewpoint image sequence by using motion estimation or motion compensation.

If the third frame rate is double the first frame rate, the 3D output image sequence may be generated to include the left-viewpoint intermediate images, the right-viewpoint intermediate images and the input image sequence in the order that they are synchronized from left and right viewpoints.

If the third frame rate is four times the first frame rate, a temporary image sequence may be first generated to include the left-viewpoint intermediate images, the right-viewpoint intermediate images and the input image sequences in the order that they are synchronized from left and right viewpoints. Then, a 3D output image sequence may be finally obtained by either inserting a black image between every two adjacent images included in the temporary image sequence or by repeating the images in the temporary image sequence.

In operation 840, the 2D or 3D output image sequence, the frame rate of which was adjusted, is reproduced in synchronization with the adjusted frame rate.

The above exemplary embodiments of the present invention may be embodied as a computer program. The computer program may be stored in a computer readable recording medium, and executed using a general digital computer. Examples of the computer readable medium include a magnetic recording medium (a ROM, a floppy disc, a hard disc, etc.), and an optical recording medium (a CD-ROM, a DVD, etc.).

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A display device for displaying a two-dimensional (2D) or a three-dimensional (3D) image, the display device comprising:
    an image display determination unit which determines whether an input image sequence having a first frame rate is a 2D image sequence or a 3D image sequence;
    a 2D frame rate conversion unit which receives the input image sequence and generates a 2D output image sequence having a second frame rate if the image display determination unit determines that the input image sequence is the 2D image sequence, wherein the 2D output image sequence comprises the input image sequence and a 2D intermediate image generated from the input image sequence; and
    a 3D frame rate conversion unit which receives the input image sequence, and generates a 3D output image sequence having a third frame rate if the image display determination unit determines that the input image sequence is the 3D image sequence, wherein the 3D output image sequence repeatedly comprises at least one left-viewpoint image and at least one right-viewpoint image of the input image sequence, a left-viewpoint intermediate image, and a right-viewpoint intermediate image in consideration of an order of the at least one left-viewpoint image and the at least one right-viewpoint image, the left-viewpoint intermediate image is determined from the at least one left-viewpoint image in a left-viewpoint image sequence included in the input image sequence, and the right-viewpoint intermediate image is determined from the at least one right-viewpoint image in a right-viewpoint image sequence included in the input image sequence,
    wherein a frame rate of the 3D) output image sequence is further increased by inserting a black image between every two adjacent images in the output mages sequence, and
    wherein at least one of the image display determination unit, the 2D frame rate conversion unit, and the 3D frame rate conversion unit is implemented as a hardware component.

2. The display device of claim 1, wherein, if the image display determination unit determines that the input image sequence is the 2D image sequence, the 2D intermediate image is displayed between adjacent images included in the input image sequence having the first frame rate.

3. The display device of claim 1, wherein, if the image display determination unit determines that the input image sequence is the 3D image sequence, the left-viewpoint intermediate image is displayed between adjacent left-viewpoint images included in the left-viewpoint image sequence and the right-viewpoint intermediate image is displayed between adjacent right-viewpoint images corresponding to the adjacent left-viewpoint images.

4. The display device of claim 2, wherein, if the image display determination unit determines that the input image sequence is the 2D image sequence, the 2D frame rate conversion unit generates the 2D intermediate image by performing motion estimation or motion compensation on the adjacent images included in the input image sequence having the first frame rate.

5. The display device of claim 3, wherein, if the image display determination unit determines that the input image sequence is the 3D image sequence, the 3D frame rate conversion unit determines the left-viewpoint intermediate image to be a first left-viewpoint image from among the adjacent left-viewpoint images, and determines the right-viewpoint intermediate image to be a first right-viewpoint image from among the adjacent right-viewpoint images.

6. The display device of claim 3, wherein, if the image display determination unit determines that the input image sequence is the 3D image sequence, the 3D frame rate conversion unit determines the left-viewpoint intermediate image to be a combination of a first left-viewpoint image and a last left-viewpoint image from among the adjacent left-viewpoint images, and determines the right-viewpoint intermediate image to be a combination of a first right-viewpoint image and a last right-viewpoint image from among the adjacent right-viewpoint images.

7. The display device of claim 3, wherein, if the image display determination unit determines that the input image sequence is the 3D image sequence and the third frame rate is double the first frame rate, the 3D frame rate conversion unit generates the 3D output image sequence to sequentially include a first left-viewpoint image from among the adjacent left-viewpoint images, a first right-viewpoint image from among the adjacent right-viewpoint images, the left-viewpoint intermediate image, the right-viewpoint intermediate image, a last left-viewpoint image from among the adjacent left-viewpoint images, and a last right-viewpoint image from among the adjacent right-viewpoint images.

8. The display device of claim 3, wherein, if the image display determination unit determines that the input image sequence is the 3D image sequence and the third frame rate is four times the first frame rate, the 3D frame rate conversion unit generates the 3D output image sequence to sequentially include a first left-viewpoint image from among the adjacent left-viewpoint images, a first right-viewpoint image from among the adjacent right-viewpoint images, the left-viewpoint intermediate image, the right-viewpoint intermediate image, a last left-viewpoint image from among the adjacent left-viewpoint images, and a last right-viewpoint image from among the adjacent right-viewpoint images, and a black image is included between every two adjacent images.

9. The display device of claim 1, wherein the image display determination unit analyzes the input image sequence in order to determine whether the input image sequence is the 2D image sequence or the 3D image sequence.

10. The display device of claim 1, wherein the image display determination unit determines whether the input image sequence is the 2D image sequence or the 3D image sequence, based on a user's instruction indicating whether the input image sequence is to be displayed as the 2D image sequence or the 3D image sequence.

11. The display device of claim 1, wherein the first frame rate is 60 Hz, and the second frame rate is 120 Hz or 240 Hz.

12. The display device of claim 1, wherein the first frame rate is 60 Hz, and the third frame rate is 120 Hz or 240 Hz.

13. The display device of claim 1, further comprising:
    a display panel which displays the 2D output image sequence or the 3D output image sequence; and
    a panel driving controller which drives the display panel to display the 2D output image sequence or the 3D output image sequence in synchronization with the second frame rate or the third frame rate, respectively.

14. A system for displaying a two-dimensional (2D) or three-dimensional (3D) image, the system comprising:
- an image supply source which supplies an input image sequence at a first frame rate;
- an image display determination unit which determines whether the input image sequence having the first frame rate is a 2D image sequence or is a 3D image sequence;
- a 2D frame rate conversion unit which receives the input image sequence and generates a 2D output image sequence having a second frame rate if the image display determination unit determines that the input image sequence is the 2D image sequence, wherein the 2D output image sequence comprises the input image sequence and a 2D intermediate image generated from the input image sequence;
- a 3D frame rate conversion unit which receives the input image sequence and generates a 3D output image sequence having a third frame rate if the image display determination unit determines that the input image sequence is the 3D image sequence, wherein the 3D output image sequence repeatedly comprises at least one left-viewpoint image and at least one right-viewpoint image of the input image sequence, a left-viewpoint intermediate image, and a right-viewpoint intermediate image in consideration of an order of the at least one left-viewpoint image and the at least one right-viewpoint image, the left-viewpoint intermediate image is determined from at least one left-viewpoint image in a left-viewpoint image sequence included in the input image sequence, and the right-viewpoint intermediate image is determined from the at least one right-viewpoint image in a right-viewpoint image sequence included in the input image sequence;
- a display panel which displays the 2D output image sequence or the 3D output image sequence; and
- a panel driving controller which drives the display panel to display the 2D output image sequence or the 3D output image sequence in synchronization with the second frame rate or the third frame rate, respectively
- wherein the 3D frame rate conversion unit further increases a frame rate of the 3D output image sequence by inserting a black image between every two adjacent images in the output image sequence.

15. A method of displaying a two-dimensional 2D or a three-dimensional (3D) image, the method comprising:
- determining whether an input image sequence having a first frame rate is a 2D image sequence or a 3D image sequence;
- generating a 2D output image sequence having a second frame rate if it is determined that the input image sequence is the 2D image sequence, wherein the 2D output image sequence comprising the first input image sequence and a 2D intermediate image generated from the first input image sequence; and
- generating a 3D output image sequence at a third frame rate if it is determined that the input image sequence is the 3D image sequence, wherein the 3D output image sequence repeatedly comprises at least one left-viewpoint image and at least one right-viewpoint image of the input image sequence, a left-viewpoint intermediate image, and a right-viewpoint intermediate image in consideration of an order of the at least one left-viewpoint image and the at least one right-viewpoint image, the left-viewpoint intermediate image is determined from the at least one left-viewpoint image in a left-viewpoint image sequence included in the input image sequence, and the right-viewpoint intermediate image is determined from the at least one right-viewpoint image in a right-viewpoint image sequence included in the input image sequence wherein a frame rate of the 3D output image sequence is further increased by inserting a black image between every two adjacent images in the output sequence.

16. The method of claim 15, wherein, if it is determined that the input image sequence is the 2D image sequence, each of the 2D intermediate images is displayed between adjacent images included in the input image sequence having the first frame rate.

17. The method of claim 15, wherein, if it is determined that the input image sequence is the 3D image sequence, the left-viewpoint intermediate image is displayed between adjacent left-viewpoint images included in the left-viewpoint image sequence, and the right-viewpoint intermediate image is displayed between adjacent right-viewpoint images corresponding to the adjacent left-viewpoint images.

18. The method of claim 16, wherein, if it is determined that the input image sequence is the 2D image sequence, the generating the 2D output image sequence comprises generating the 2D intermediate image by performing motion estimation or motion compensation on the adjacent images included in the input image sequence having the first frame rate.

19. The method of claim 17, wherein, if it is determined that the input image sequence is a 3D image sequence, the generating the 3D output image sequence comprises:
- determining the left-viewpoint intermediate image to be a first left-viewpoint image from among the adjacent left-viewpoint images; and
- determining the right-viewpoint intermediate image to be a first right-viewpoint image from among the adjacent right-viewpoint images.

20. The method of claim 17, wherein, if it is determined that the input image sequence is the 3D image sequence, the generating the 3D output image sequence comprises:
- determining the left-viewpoint intermediate image to be a combination of a first left-viewpoint image and a last left-viewpoint image from among the adjacent left-viewpoint images; and
- determining the right-viewpoint intermediate image to be a combination of a first right-viewpoint image and a last right-viewpoint image from among the adjacent right-viewpoint images.

21. The method of claim 17, wherein, if it is determined that the input image sequence is the 3D image sequence and the third frame rate is twice the first frame rate, the generating the 3D output image sequence comprises generating the 3D output image sequence to sequentially include a first left-viewpoint image from among the adjacent left-viewpoint images, a first right-viewpoint image from among the adjacent right-viewpoint images, the left-viewpoint intermediate image, the right-viewpoint intermediate image, a last left-viewpoint image from among the adjacent left-viewpoint images, and a last right-viewpoint image from among the adjacent right-viewpoint images.

22. The method of claim 17, wherein, if it is determined that the input image sequence is the 3D image sequence and the third frame rate is four times the first frame rate, the generating the 3D output image sequence comprises generating the 3D output image sequence to sequentially include a first left-viewpoint image from among the adjacent left-viewpoint images, a first right-viewpoint image from among the adjacent right-viewpoint images, the left-viewpoint intermediate image, the right-viewpoint intermediate image, a last left-viewpoint image from among the adjacent left-viewpoint images, and a last right-viewpoint image from among the adjacent right-viewpoint images, and a black image is included between two adjacent images.

23. The method of claim 15, wherein the determining whether the input image sequence having the first frame rate is the 2D image sequence or the 3D image sequence comprises analyzing the input image sequence.

24. The method of claim 15, wherein the determining whether the input image sequence having the first frame rate is the 2D image sequence or the 3D image sequence comprises:
   receiving a user's instruction indicating whether the input image sequence is to be displayed as the 2D image sequence or the 3D image sequence; and
   determining whether the input image sequence is the 2D image sequence or the 3D image sequence, based on the user's instruction.

25. The method of claim 15, further comprising displaying the 2D output image sequence or the 3D output image sequence in synchronization with the second frame rate or the third frame rate, respectively.

26. The method of claim 15, wherein the first frame rate is 60 Hz, and the second frame rate is 120 Hz or 240 Hz.

27. The method of claim 15, wherein the first frame rate is 60 Hz, and the third frame rate is 120 Hz or 240 Hz.

28. A computer readable recording medium having recorded thereon a computer program for executing the method of claim 15.

* * * * *